July 12, 1949.　　　　　S. H. HALL　　　　　2,476,192
HOIST
Filed Dec. 5, 1946　　　　　　　　　　　　　　3 Sheets-Sheet 3

INVENTOR.
SELDEN H. HALL
BY
ATTORNEY

Patented July 12, 1949

2,476,192

UNITED STATES PATENT OFFICE 2,476,192

HOIST

Selden H. Hall, Poughkeepsie, N. Y., assignor to The De Laval Separator Company, New York, N. Y., a corporation of New Jersey Application December 5, 1946, Serial No. 714,247

5 Claims. (Cl. 212—31)

This invention relates to hoists and more particularly to an improved hoist adapted especially for use in cow barns, and the like, in connection with a source of pressure differential, such as the vacuum line commonly used for operating milking machines.

According to common dairy practice, the cow barn is provided with a milking machine installation including a vacuum line extending through the barn and to which the individual milking machine units are adapted to be connected. After the milking operation, the cans of milk must be cooled and maintained at a proper storage temperature until they are ready for shipment. The milk coolers are generally box-like arrangements containing a cooling liquid and which open at the top. Accordingly, in the use of these coolers, it is necessary to lift the milk cans a substantial distance to place them into and remove them from the cooler. Due to the weight of the cans of milk considerable difficulty is encountered in handling them manually in this manner, and it would be a distinct advantage to have available in the barn a simple form of power hoist for this purpose.

One object of the present invention, therefore, resides in the provision of a hoist of simple construction operable directly from the vacuum line in a cow barn to lift the cans of milk, as in placing them into or removing them from the milk cooler.

Another object is to provide a pneumatic hoist having a pulley arrangement with a cable, or the like, operable by a piston in a cylinder which is connected to the vacuum line, the vacuum connection being controlled by a valve member movable selectively to connect the cylinder to the vacuum line or to atmosphere, whereby the free end of the cable may be raised or lowered.

A further object is to provide a hoist of the character described, in which both the pulley arrangement and the cylinder are disposed in a common vertical plane through their axes and are adapted to swing together about a vertical support, the cylinder being preferably adjustable vertically on the support to adjust the hoist.

Still another object is to provide a control valve especially adapted for a hoist of this character, which is so constructed as to prevent or reduce leakage of air into the vacuum line for operating the hoist.

These and other objects of the invention will be better understood by reference to the following detailed description and the accompanying drawings, in which Fig. 1 is a perspective view of one form of the new hoist;

Fig. 2A is a similar view of part of a modified form of the cylinder;

Figure 1:
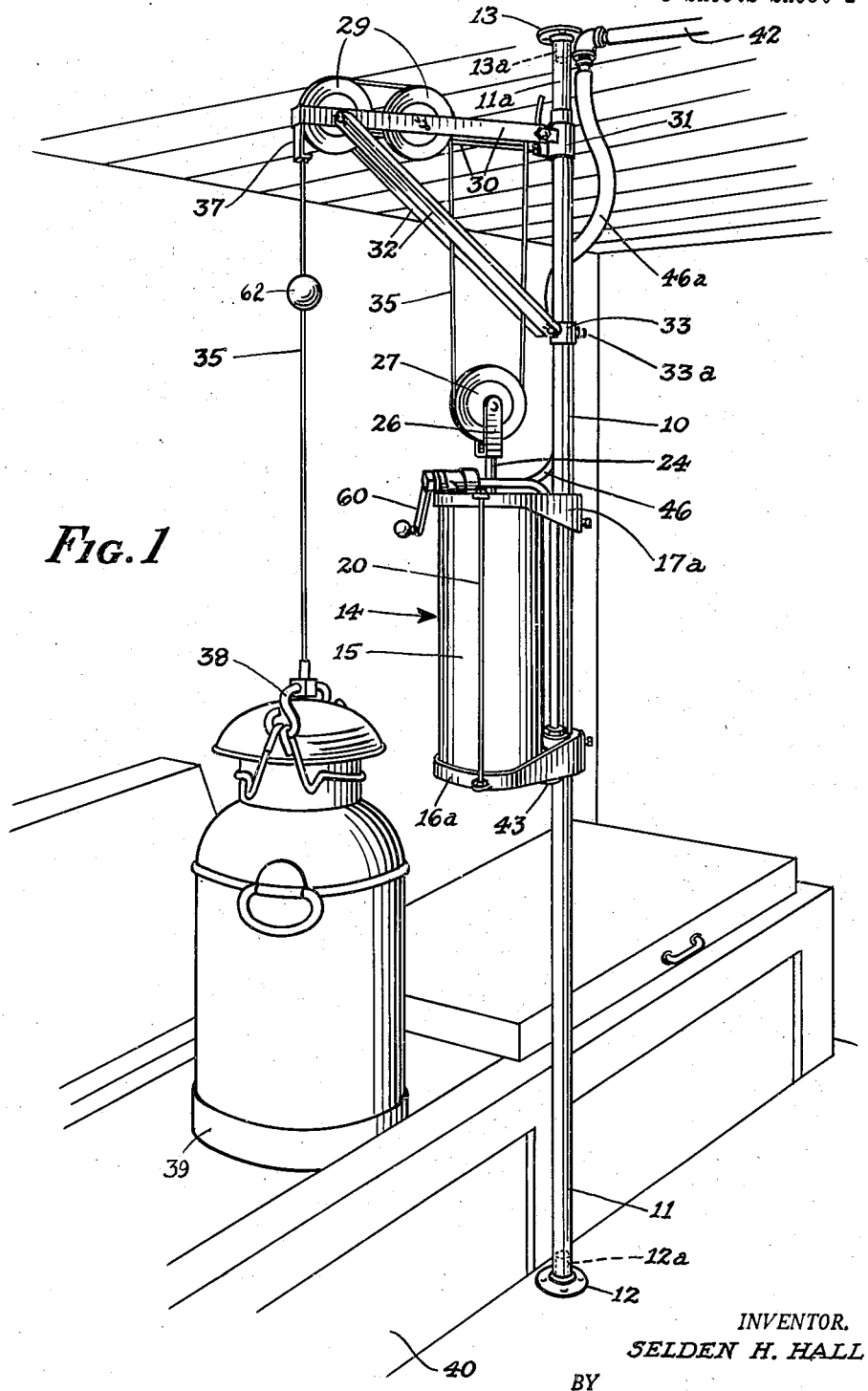

Referring to Fig. 1, the hoist comprises a generally vertical support 10 in the form of a pair of telescoping pipes 11 and 11a. The lower pipe 11 is rotatable on a plate 12 secured to the floor and having a central hub 12a projecting into the pipe to prevent lateral displacement thereof. The upper pipe 11a extends into the lower pipe and is rotatable on a plate 13 secured to the ceiling and having a central hub 13a projecting into the upper pipe. A clamping screw 11b (Fig. 8) extends through a hole near the top of pipe 11 and abuts against pipe 11a, thereby maintaining pipes 11 and 11a in fixed relation so that they turn about their axes as a unit. It will be apparent that the pipes 11 and 11a, by reason of their telescopic fit, may be extended or contracted to accommodate different ceiling heights and then locked together by the screw 11b.

Figure 2:
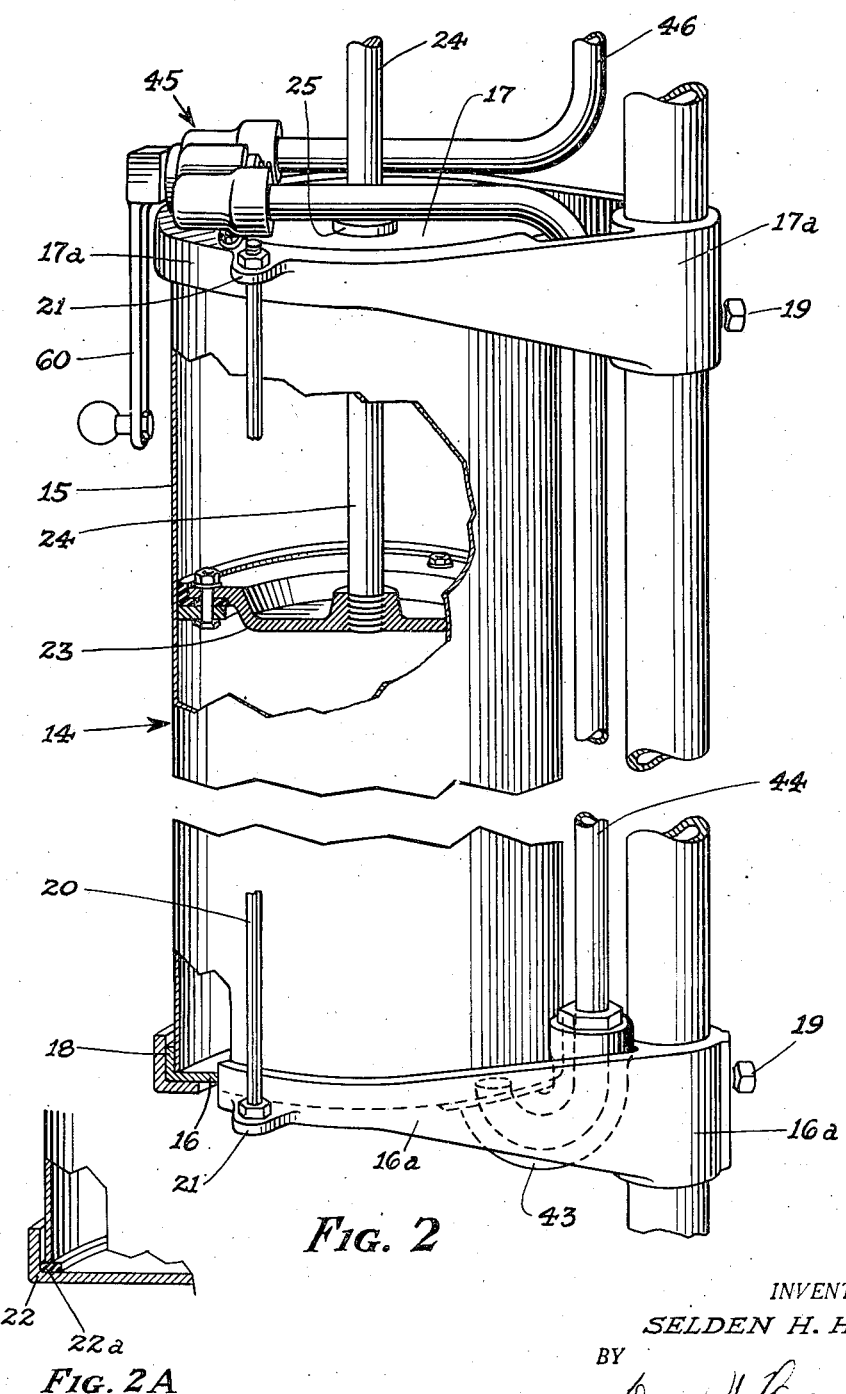
Fig. 2 is an enlarged perspective view, partly in section, of the hoist cylinder shown in Fig. 1.
Figure 3:
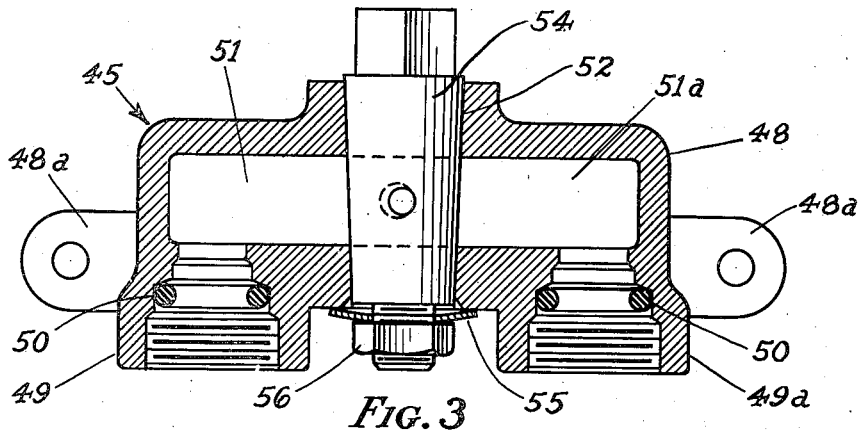
Fig. 3 is a generally horizontal sectional view of the control valve for the hoist shown in Fig. 1.
Figure 4:
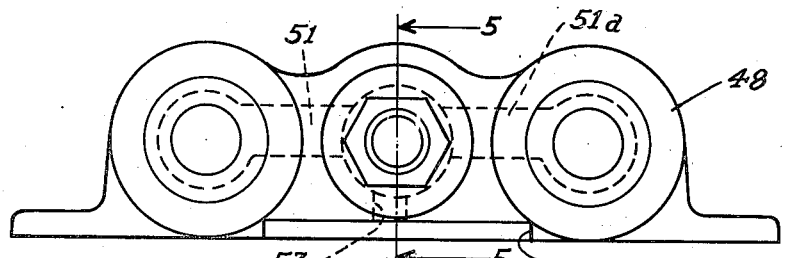
Fig. 4 is an end view of the valve shown in Fig. 3.

A cylinder 14 is mounted on the lower pipe 11 at a height such that the top of the cylinder can be conveniently reached by the operator, and at the same time the bottom will clear the top of the milk cooler 40. As shown particularly in Fig. 2, the cylinder comprises a cylindrical shell 15 and end pieces 16 and 17 on the bottom and top, respectively, of the shell. The end pieces 16 and 17 are provided with peripheral flanges 18 which receive the corresponding ends of the shell 15, the joints between the shell and the end pieces being made air-tight, as by soldering. The end pieces 16 and 17 are held in brackets 16a and 17a, respectively, through which the supporting pipe 11 extends. The brackets are slidable vertically on the pipe 11 but are normally secured in fixed positions by suitable clamping means, such as clamping screws 19. Tie rods 20 extend between the brackets 16a and 17a and are secured to ears 21 on the brackets, whereby the latter are held tightly against the end pieces 16 and 17 and clamp them to the shell 15. As shown, the screws 19 are arranged on the brackets 16a and 17a so that when the screws are tightened, they tend to tilt the outer portions of the brackets together with a clamping action on the shell 15, thereby supplementing the action of the tie rods.

As an alternative construction, each end piece 16 and 17, its flange 18, and the corresponding bracket 16a, 17a may be made in a single piece, as shown at 22 in Fig. 2A. In this case, a sealing ring 22a may be interposed between each end of the shell 15 and the adjacent end piece or bracket 22.

The cylinder 14 contains a piston 23 which is fitted closely in the cylinder and slidable therein. A rod 24 projects upwardly from the piston through a central opening in the upper end of the cylinder, this opening being provided with a guide bushing 25 having a loose sliding fit around the rod. At its upper end, the piston rod 24 has a yoke 26 in which a pulley 27 is mounted for rotation. The pulley 27 forms part of a pulley system including one or more pulleys 29 mounted on an arm spaced above the cylinder. The arm, as shown, comprises two parallel sections 30 connected at their inner ends to a bracket 31 which is held in a fixed position on the supporting pipe 11 by the clamping screw 11b, the pulleys being rotatably mounted between the two sections of the arm. The arm is braced by two parallel bracing members 32 extending from near the outer end of the arm to a bracket 33 secured to the pipe 11 between the cylinder and the bracket 31. The bracket 33 is adjustable vertically on the support but is normally held in a fixed position by a suitable clamping screw 33a.

Figures 5, 8:
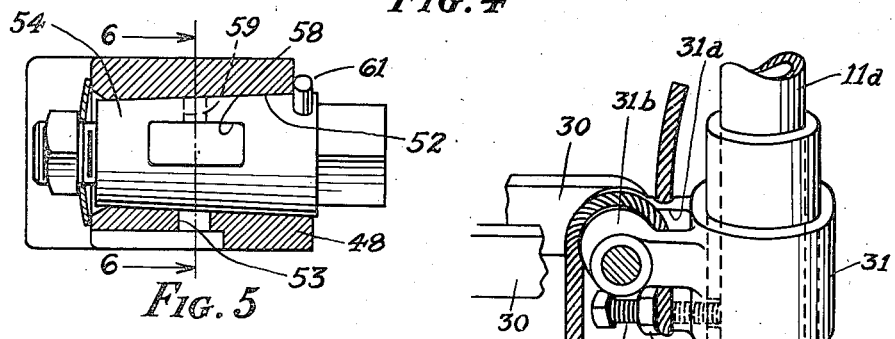
Fig. 5 is a sectional view on the line 5—5 in Fig. 4.
Fig. 8 is a detailed perspective view of the clamping arrangement for one end of the cable which engages the pulleys.

A flexible tension member, such as a cable 35, is secured at one end between the two sections 30 of the arm and near the supporting pipe 11, as by means of the nut 11c on the clamping screw 11b in bracket 31. As shown in Fig. 8, the screw 11b is screwed into the lower part of bracket 31 and extends through pipe 11 into abutment with the inner pipe 11a so as to lock the pipes together. The cable 35 extends downwardly from a loose end and under the screw 11b, the cable being clamped against bracket 31 by a nut 11c on the screw. From the nut 11c, the cable extends upwardly through an opening 31a in the bracket and then outwardly over a grooved part 31b by which the arm sections 30 are connected to the bracket. From the grooved part 31b, the cable extends downwardly around the pulley 27 and then upwardly between the arm sections 30 and over the pulleys 29. In order to prevent binding of the piston rod 24 in the bushing 25 during movement of the piston, the juncture of the cable with the part 31b and its initial point of contact with the first pulley 29 should be equidistant from the vertical axis of the piston rod. From the outer pulley 29, the cable extends downwardly through a guide 37 on the end of the arm, and the lower or free end of the cable is connected to a grapple 38 adapted to fit around the neck of a milk can 39 which is to be placed into or removed from a cooler 40. The grapple 38 may be of the construction disclosed in my copending application Serial No. 635,181 filed December 15, 1945.

The piston 23 is moved downwardly in the cylinder 14 to raise the free end of cable 35, by a pressure differential created in the cylinder from the vacuum line 42 of a milking machine installation in the barn. More particularly, the lower end piece 16 of the cylinder has a pipe elbow 43 communicating at one end with the interior of the cylinder and at the other end with a tube or duct 44. The latter extends upwardly from the elbow between the cylinder and the supporting pipe 11 and through the end piece 17, the upper end portion of the tube 44 overlying the cylinder and being connected to a control valve 45 to be described presently. The control valve is connected to a pipe 46 which includes a flexible hose section 46a leading to the vacuum line 42, the hose 46a having a substantial amount of slack.

Referring to Figs. 3 to 6, inclusive, the control valve 45 comprises a valve casing 48 provided with ears 48a projecting from its ends for securing the valve casing to the bracket 17a at the top of the cylinder. Hollow bosses 49 and 49a project rearwardly from the opposite end portions of casing 48 and are internally threaded to receive fittings on the tube 44 and pipe 46, respectively. A sealing ring 50 may be located on a shoulder in each of the hollow bosses 49 and 49a, in position to make tight joints with the respective pipe fittings. The bosses 49 and 49a communicate with longitudinal flow passages 51 and 51a, respectively, which open into opposite sides of a central, conical valve seat 52. In the bottom of the valve casing is a relatively small port 53 communicating with atmosphere and opening into the lower part of the valve seat 52. However, the port 53 is so located that its entrance opening into the valve seat is nearer to the flow passage 51 leading to the cylinder than to the flow passage 51a from the vacuum line. Accordingly, the valve seat 52 presents a larger surface between the port 53 and the entrance opening of passage 51a than between the port 53 and the entrance opening of passage 51.

A conical valve member or cock 54 is rotatable in the valve seat 52 and is held therein by any suitable means, such as a spring washer 55 compressed between the casing 48 and a nut 56 threaded on a projecting end of the cock. A passage 58 extends transversely through the cock 54 and communicates with a smaller or throttling passage 59 which extends at right angles to the main passage 58 and opens into the periphery of the cock (Fig. 6).

Figures 6, 7:
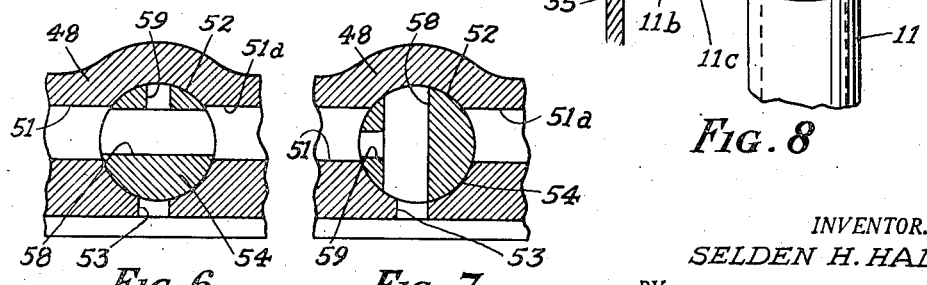
Fig. 6 is a sectional view on the line 6—6 in Fig. 5, showing one operating position of the control valve.
Fig. 7 is a sectional view similar to Fig. 6, but showing the valve in another operating position.

As shown particularly in Figs. 6 and 7, the flow passages 51, 51a open into the valve seat 52 substantially farther from the port 53 than from the opposite side of the seat, that is the top of the seat. Also, the transverse passage 58 in the cock is located substantially nearer to the outer end of the smaller passage 59 than to the diametrically opposite side of the cock.

The valve cock 54 is rotatable through substantially 90 degrees between the position shown in Fig. 6, in which the flow passages 51 and 51a are interconnected through the cock passage 58 and the position shown in Fig. 7 in which the smaller passage 59 in the cock communicates with the flow passage 51 while one end of passage 58 communicates with port 53. This movement of the valve may be effected by a handle 60 secured to a projection on the front end of the cock. The cock may also be provided with a pin 61 (Fig. 5) engageable with stops on the valve casing to prevent rotation of the cock beyond the positions described.

The operation of the hoist is as follows: When it is desired to lift the milk can 39, the grapple 38 is placed in position around the neck of the can, as shown, and the cock 54 is moved to the position shown in Fig. 6. Thereupon, air is exhausted from the lower end portion of cylinder 14 through tube 44, passages 51, 58 and 51a, and pipe 46, 46a to the vacuum line 42. As a result, atmospheric pressure acts upon the top of piston 23 to move the piston downward in the cylinder and lower the pulley 27. The free end of cable 35 is thus elevated to lift the milk can 39, until the piston reaches the bottom of cylinder 14. The milk can may then be swung in a horizontal plane on the arm 30, the pipes 11 and 11a rotating for this purpose so that the cylinder and the arm will swing together. To lower the milk can, the cock 54 is turned to the position shown in Fig. 7 in which air flows from atmosphere through port 53, cock passage 58, the throttling passage 59, flow passage 51, and tube 44 to the lower end of the cylinder. In this flow of air to the cylinder, the relatively small port 53 and cock passage 59 have a throttling effect so as to prevent the milk can from descending too rapidly. In addition, the compression of air in the cylinder by upward movement of the piston will act to retard downward movement of the milk can, since the only air escape is through the loose bushing 25. If desired, the speed of descent of the milk can may be further regulated by movement of the valve cock to cut off the flow of air through port 53.

The control valve 45 is admirably suited for preventing leakage of air from the port 53 into the vacuum line 42 or the bottom of the cylinder. By arranging the flow passages 51, 51a in the valve casing and the passages 58 and 59 in the cock, as described, any air leakage from port 53 to passage 51 or 51a would have to pass along a large part of the periphery of the cock. Also, by locating the port 53 nearer the flow passage 51 than the opposite flow passage 51a, any leakage from this port would have to pass around a relatively large part of the periphery of the cock in order to reach passage 51a and the vacuum line. This is an advantageous feature of the new hoist, since it acts to prevent an excessive burden on the vacuum line 42 of the milking system.

It will be observed that the new hoist is of simple construction, may be readily installed, and is easy to operate. Since the cylinder 14 may be moved to different vertical positions on the support, by sliding brackets 16b and 17b up or down on the support, the hoist can be readily adjusted for varying conditions under which the hoist is to be used. By locating the control valve 45 on top of the cylinder or on the support 10, the valve is readily accessible to the operator and will swing with the cylinder and the arm 30. If desired, the cable 35 may be provided with a weight 62 adapted to overcome inherent friction of the piston and pulley system when it is desired to lower the grapple without a milk can attached thereto.

In order to prevent dust and dirt from entering the valve casing 48 through the port 53, I prefer to place a suitable filtering material (not shown) in a recess 48b in the bottom of the valve casing directly under the port 53. The filtering material, of course, will be clamped in position between the valve casing and the cylinder 14 on which it is mounted.

While I have shown the control valve 45 mounted on the cylinder 14, it will be understood that the valve may be mounted directly on the supporting pipe 11, in which case the bosses 49 and 49a on the valve casing are preferably arranged to extend in opposite directions and parallel to pipe 11. In this way, the connections 44 and 46 to and from the valve will extend straight along the support 10.

I claim:

1. In a hoist adapted especially for use in cow barns in connection with a vacuum line, or the like, and having a generally vertical support, an arm mounted on the support and adapted to swing thereon in a generally horizontal plane, a pulley on the arm, a cylinder and a piston slidable therein and having a rod projecting from one end of the cylinder, and a flexible tension member connected to the free end of the piston rod and extending at least partly around the pulley, the free end of said member depending from the pulley, the improvement which comprises a vertically adjustable bracket slidable on the support and carrying the cylinder in a vertical position with the free end of said rod extending upwardly toward said arm, and a valve carried by the bracket and having communication with the interior of the cylinder, the valve being operable to connect the cylinder interior alternately to a vacuum source and to atmosphere.

2. The improvement as defined in claim 1, comprising also a second bracket for mounting the arm on the support, the support including a pair of telescoping elements, and a clamp screw on the second bracket extending through the outer of said telescoping elements and abutting against the inner element to lock said elements together.

3. The improvement as defined in claim 1, comprising also a second bracket for mounting the arm on the support, and a clamp screw securing the second bracket to the support and clamping one end portion of the tension member to the second bracket.

4. The improvement as defined in claim 1, in which the cylinder includes a cylindrical shell, covers at the ends of the shell, brackets adjustable vertically on the support and holding the covers on the shell, and a tie rod extending between the covers.

5. The improvement as defined in claim 1, comprising also a second bracket for mounting the arm on the support, the support including a pair of telescoping elements, a clamping screw on the second bracket extending through the outer of said telescoping elements and abutting against the inner element to lock said elements together, and a nut on the clamp screw for clamping one end portion of the tension member to the second bracket.

SELDEN H. HALL.

REFERENCES CITED

The following references are of record in the file of this patent:

UNITED STATES PATENTS

| Number | Name | Date |
|---|---|---|
| 312,423 | Bezancon | Feb. 17, 1885 |
| 671,671 | Horsley | Apr. 9, 1901 |
| 771,846 | Thompson | Oct. 11, 1904 |
| 788,789 | Ord | May 2, 1905 |
| 1,540,630 | Jenks et al. | June 2, 1925 |
| 1,584,117 | Mitchell | May 11, 1926 |
| 1,595,302 | Hayes | Aug. 10, 1926 |
| 2,000,552 | Zaikowsky | May 7, 1935 |

FOREIGN PATENTS

| Number | Country | Date |
|---|---|---|
| 384,272 | Great Britain | Feb. 18, 1931 |